United States Patent [19]

Shimizu

[11] Patent Number: 4,837,692
[45] Date of Patent: Jun. 6, 1989

[54] ELECTRIC POWER STEERING SYSTEM FOR VEHICLES

[75] Inventor: Yasuo Shimizu, Saitama, Japan

[73] Assignee: Honda Giken Kogyo Kabushiki Kaisha, Tokyo, Japan

[21] Appl. No.: 30,323

[22] Filed: Mar. 26, 1987

[51] Int. Cl.$^4$ .............................................. B62D 5/06
[52] U.S. Cl. .............................. 364/424.05; 180/79.1; 180/142
[58] Field of Search .................... 364/424; 74/388 PS; 180/79.1, 141, 142, 143

[56] References Cited

U.S. PATENT DOCUMENTS

| | | | |
|---|---|---|---|
| 4,657,103 | 4/1987 | Shimizu | 180/79.1 |
| 4,664,211 | 5/1987 | Oshita et al. | 180/79.1 |
| 4,666,011 | 5/1987 | Ohe et al. | 364/424 |
| 4,681,181 | 7/1987 | Shimizu | 180/79.1 |
| 4,688,655 | 8/1987 | Shimizu | 180/79.1 |
| 4,715,461 | 12/1987 | Shimizu | 180/79.1 |
| 4,715,463 | 12/1987 | Shimizu | 180/142 |
| 4,726,437 | 2/1988 | Norton | 180/79.1 |

Primary Examiner—Gary Chin
Attorney, Agent, or Firm—Armstrong, Nikaido Marmelstein & Kubovcik

[57] ABSTRACT

An electric power steering system (20) comprises a control device (32) which controls a direct-current motor (49) for operatively providing auxiliary torque to a steering shaft (26) in dependence on steering torque (Ts) acting on the steering shaft. The control device (32) includes a control signal generating circuit (70) which generates a PWM signal (t3, T4, T5) for controlling the motor in dependence on the steering torque, and a motor drive circuit (80) which receives the PWM signal and impresses an on-off voltage to the motor, the drive circuit (80) having a close circuit (49-86-80a, 49-83-80d) in which an electric current (Ia) due to an inductance of the motor flows while the on-off voltage is off. The steering system (20) further comprises a mechanism (76) for detecting a steering speed (Ns) of a steering wheel. The control signal generating circuit (70) generates the PWM signal in dependence, in a positive steering state in which the rotating direction of the steering wheel is coincident with the acting direction of the steering torque, on a first function (125, 126) and, in a steering wheel returning state in which the rotating direction of the steering wheel is not coincident with the acting direction of the steering torque, on a second function (127, 128), having the steering torque and the steering speed as parameters thereof.

8 Claims, 7 Drawing Sheets

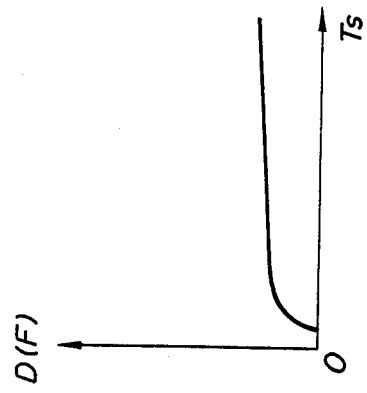
FIG. 7
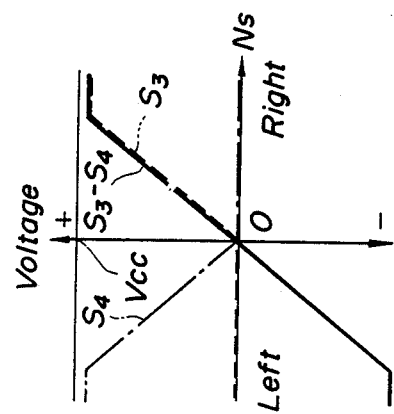
FIG. 6
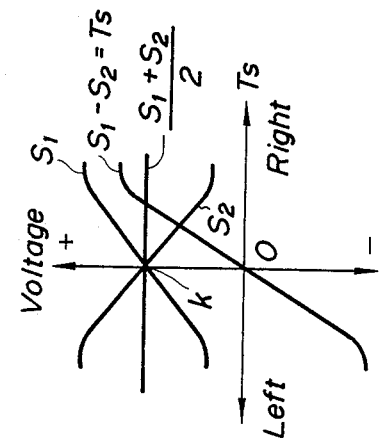
FIG. 5
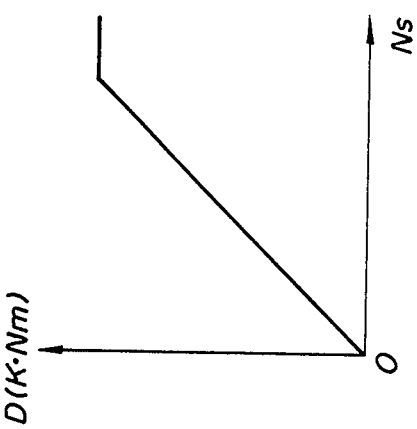
FIG. 10
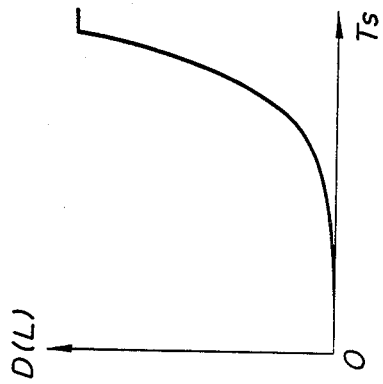
FIG. 9
FIG. 8

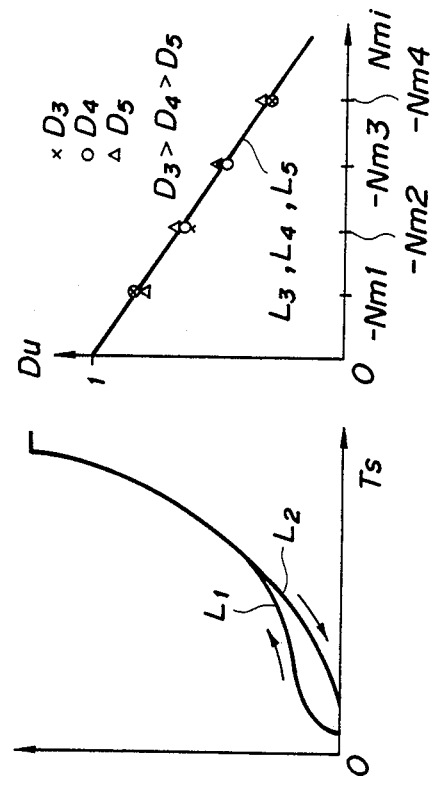
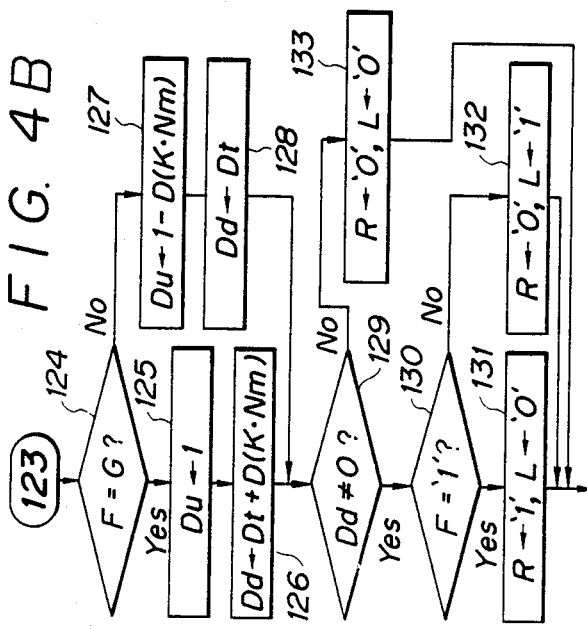
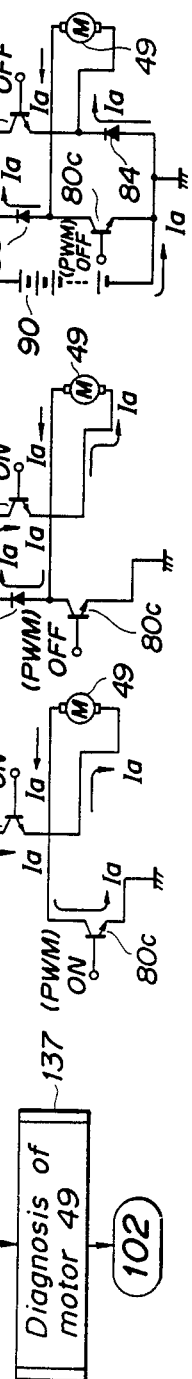

ELECTRIC POWER STEERING SYSTEM FOR VEHICLES

BACKGROUND OF THE INVENTION

1. Field of the Invention

The present invention relates to an electric power steering system for vehicles, and more particularly, to an electric power steering system for vehicles in which auxiliary torque for steering is produced by means of a steering servo device using an electric motor.

2. Description of Relevant Art

There have been proposed in recent years a variety of electric power steering systems for vehicles in which auxiliary torque for steering is produced by means of a steering servo device using an electric motor.

As an example, there is a steering system disclosed in UK Patent Application Publication GBA No. 2132950. The steering system includes a torque detection mechanism for detecting steering torque acting on an input shaft connected to a steering wheel, an output shaft connected to front wheels as steered wheels, a direct-current motor for giving auxiliary torque to the output shaft, and a control circuit for controlling the motor in dependence on a detection signal from the torque detection mechanism. FIG. 15 shows a motor drive circuit 200 equivalent to the control circuit. The drive circuit 200 consists of a bridge circuit 201 for applying an auxiliary torque producing electric motor 220 with an armature voltage Va and a drive unit 210 for feeding the bridge circuit 220 with drive signals. To the drive unit 210 is input a control signal 211 from an unshown signal processor. In the processor a steering torque representative signal is processed, following a given program, so that the control signal 211 has, for example, such a component as responsible for the direction of rotation of the motor 220 to be coincident with that of steering torque Ts acting on the input shaft. The bridge circuit 201 comprises npn type switching transistors 202, 203, 204, 205 constituting four arms of the bridge, respectively. Transistors 202, 203 and 204, 205 have diodes 206, 207 and 208, 209 connected in parallel thereto respectively, and inverse-parallel to the motor 220. An output lead of the circuit 201 extends from the node between neighboring two transistors 202, 203, and another from that between the remaining two transistors 204, 205. The output leads constitute a loop across the motor 220. Input leads, which extend from the positive and negative poles of a power supply of a constant voltage Vcc, terminate at the node between neighboring two transistors 205, 202 and that between the remaining two transistors 203, 204, respectively. The drive unit 210 has four output terminals connected to the bases of transistors 202 to 205, respectively. The transistors 202 to 205 are driven by the drive unit 210 in accordance with contents of control signal 211. For example, if the signal 211 is responsible for causing the motor 220 to rotate in such a direction A as corresponding to clockwise acting steering torque Ts, then the transistor 202 is driven on in a continuous manner and the transistor 204 in a PWM (pulse width modulation) control manner. Transistor 204 is then applied at the base with a PWM signal which is a frequency-constant pulse signal of a rectangular wave with a level of supply voltage Vcc, as modulated with respect to the pulse width, i.e., controlled of its duty D (proportion of pulse duration) in dependence on a component of the control signal 211. To the contrary, if the signal 211 is for rotating the motor 220 in the opposite direction B which corresponds to counterclockwise acting steering torque Ts, the transistor 205 is driven on in a continuous manner and the transistor 203 in a PWM control manner. The duty D of the PWM signal applied to transistor 204 or 203 has a value determined in proportion to the magnitude of steering torque Ts. The motor 220 is applied with an armature voltage Va of which the magnitude is proportional to such a value of duty D. As a result, the armature voltage Va the bridge circuit 201 applies across the motor 220 has the magnitude properly controlled as well as the polarity thereof, with the transistors 203, 204 either PWM driven.

FIGS. 16A and 16B show circuit diagrams substantially equivalent to the bridge circuit 201 working with the transistors 202, 204 driven in combination so as to rotate the motor 220 in the direction A in correspondence to clockwise acting steering torque Ts. Transistor 202 is continuously driven on, and transistor 204 PWM driven. In strict accordance with the cited UK Publication, of two switching transistors working in combination, one to be PWM driven is put between the positive pole of a battery and an electric motor and the other to be continuously driven on is between the motor and the negative pole of the battery. Such differences may well be neglected.

The circuit of FIG. 16A corresponds to a state in which the transistor 204 is turned on with the PWM signal sent thereto at the level Vcc. With power supply 230, transistor 202, motor 220, and transistor 204, there is formed a close circuit, which conducts an electric current across the motor 220, i.e., an armature current Ia. The armature current Ia has a magnitude corresponding to a load imposed on the motor 220 from the road surface, via the output shaft. The output shaft connected to the front wheels, as steered road wheels, is mechanically interconnected through a rack and pinion mechanism and the like with the steering wheel. Thus, a later-described restoring force Fr, acting as a load in the form of a moment from the road surface side, the motor 220 bears such a share as resulted by subtracting the steering torque Ts from the load Fr. FIG. 16B represents a state when the transistor 204 is turned off. A close circuit is formed with transistor 202, motor 220 and diode 209 so that there is a transient armature current of the de-energized motor 220. Like the armature curent Ia in the close circuit of FIG. 16A, the transient armature current is interlinked with the load on the motor 220, through an internal inductance of the motor 220 which induces a counter emf (electromotive force) Vi in dependence on the rpm (number of revolutions per minute) of a rotor having a certain mass of inertia.

As well as in steering systems without power assist, the steering wheel in the above power steering system is put in either of two different states when it rotates, i.e., a positive steering state or a returning state. In the positive steering state, the steering wheel has steering torque Ts applied thereto in such a direction as coincident with the turning direction of the steered wheels, and hence with the direction of rotation of the motor 220 as well. In the returning state of the steering wheel, however, the acting direction of steering torque Ts applied thereto is not coincident with, but opposite to, the turning direction of the steered wheels so that the rotating direction of motor 220 is opposite to the acting direction of the steering torque Ts.

When a traveling vehicle turns with front wheels as steered wheels thereof turned in either direction by a steering system, the front wheels have a system of forces produced by their wheel alignment and self-aligning torque due to deformations of their tires. A collective resultant of such forces acts as a couple on the front wheels with a tendency to return the wheels to their neutral positions, and is called a "restoring force". The restoring force is transmitted in the form of a moment to the steering system, and applied thereon as a load from the road surface.

In a vehicle equipped with the electric power steering system described, when it turns while traveling, if the front wheels are acted on by a restoring force Fr developed, for a certain reason, larger in magnitude than the sum of steering torque Ts applied to the steering wheel and auxiliary torque output from the motor 220, the steering wheel is caused to rotate, with a moment transmitted from the front wheels, in the opposite direction to the acting direction of the steering torque Ts. Also the motor 220 is forced to rotate in a reverse direction, which corresponds to the direction B in the case the vehicle turns to the right, for example. Such a situation sometimes takes place when the magnitude of steering torque Ts, applied by the driver to the steering wheel, is small, while the vehicle is turning, with an intention to leave the front wheels returning toward the neutral positions with a restoring force Fr acting thereon. This is a typical example of the steering wheel returing state.

Steering torque Ts is now supposed to be clockwise acting, so that the transistor 202 is continuously driven on, and the transistor 204 PWM driven with a PWM signal of which the duty D has a value determined in accordance with the steering torque Ts. While the transistor 204 is on, the armature current Ia is conducted as shown by arrows in FIG. 16A. During the positive steering state of the steering wheel, the motor 220 rotates in the direction A, producing auxiliary torque that permits a more comfortable steering operation than would be achieved in a steering system without assist power. In the steering wheel returning state, however, the motor 220 is rotated in the direction B and functions as a generator. The returning speed of the steering wheel toward its neutral position may thus be appreciably slower than expectable in the non-assisted steering system.

In this respect, the transistors 202, 204 themselves are controlled to be driven in combination to rotate the motor 220 in the direction A, whenever steering torque Ts acts clockwise, how small its magnitude would be. In actual, the magnitude of steering torque Ts is very small in the steering wheel returning state and hence the value of the duty D of the PWM signal, as well. This results in a very large fraction of pulse period to be shared for the equivalent circuit of FIG. 16B to substitute for the circuit of FIG. 15, whereas the duration of substitution of that of FIG. 16A becomes even shorter. The close circuit 220-209-202 of FIG. 16B is thus maintained over such a large fraction of pulse period.

In the steering wheel returning state, the motor 220 rotating in the direction B has a counter emf Vi induced thereacross by generator action with such a polarity that it increases the total emf of the close circuit of FIG. 16A. When the transistor 204 is turned off, such a counter emf Vi produces in the close circuit 220-209-202 of FIG. 16B a transient armature current Ia' of which the flow direction with respect to the motor 220 is the same as that of the armature current Ia, as shown by arrows in FIG. 16B. Permitted conduction of such an armature current Ia' through the close circuit 220-209-202 implies that the front wheels have to perform an appreciable work. The front wheels thus tend to be unsmooth in returning to the neutral positions. If the vehicle speed is constant while turning, the restoring force Fr is at the maximum when the front wheels starts returning to the neutral positions, and becomes smaller as they approach the same. The above tendency is thus significant in an initial phase of the steering wheel returing state. In the steering wheel returning state, the diodes 207, 209 in the drive circuit 200 of FIG. 15 are forward connected with respect to the armature current Ia' so that there is formed another close circuit with motor 220, diode 209, power supply 230, diode 207, and unshown resistors and the like. Such a close circuit however is neglectable in the present discussion.

Discussion is continued from a theoretical viewpoint, with reference to FIG. 17. The axis of abscissa represents the duty D of the PWM signal to the transistor 204, and that of ordinate the armature current of the motor 220 in terms of effective value (collectively designated by Ia). On the D-Ia plane, there is plotted characteristic curves of the motor 220, with the motor rotation speed Nm as the parameter. In the graph, DZ is a dead zone for the drive circuit 200 to drive the motor 220 to rotate in the direction A. Nmi (i=1 to 4) is a particular rotation speed in terms of rpm of the motor 220, as algebraically represented such that the motor 220 is rotated in the direction A when Nmi is positive or has no signs, and in the direction B when it has a negative sign. Where Nmi is signed negative, therefore, the steering wheel is in the returning state. Steering torque Ts is still supposed to be clockwise acting. An armature current Ia1 is needed to be conducted through the motor 220, against a restoring force Fr1 acting on the front wheels. Under such a condition, if the rotation speed Nm is desired to be controlled at zero (Nmi=0), the duty D should be set to such a value D1 that a resulted effective voltage as an armature voltage Va to be applied to the motor 220 permits the armature current Ia1 to flow without counter emf Vi induced across the motor 220. To have the motor 220 rotate with a positive rotation speed Nm3, the duty D should be selected to be a value D2 such that D2=D1+a, where a is a necessary increment of duty D corresponding to that of armature voltage Va for cancelling the effect of an induced counter emf Vi when the rotation speed Nm is raised (from 0) to Nm3. Such a counter emf Vi otherwise would decrease the armature current Ia (from Ia1). To have the motor 220 rotate with a negative rotation speed −Nm3, there should be selected a duty value D0 such that D0=D1−b, where b is a necessary decrement of duty D for keeping the armature current Ia from being increased by an induced counter emf Vi at the rotation speed −Nm3. The duty value D0 however lies within the dead zone DZ, and cannot be set by the drive circuit 200. If the value Fr1 of restoring force Fr is one in the initial phase of the steering wheel returning state, the restoring force Fr becomes smaller than Fr1 as the front wheels approach the neutral positions, and hence the armature current Ia gradually decreases therewith from the value Ia1. To control the motor 220 at the negative rotation speed −Nm3 when a smaller armature current than Ia1 is conducted therethrough, the duty D must be a value not exceeding zero. The drive circuit 200 however is unable to set below zero the duty D of the PWM signal which is sent to the transistor 204, whenever steering torque Ts is clockwise acting.

The present invention has been achieved to effectively solve such problems in the prior art described.

SUMMARY OF THE INVENTION

An object of the present invention is to provide an electric power steering system for vehicles which is favorable of a steering wheel returning characteristic, while including in a control device thereof a motor drive circuit for applying an electric motor with an on-off controlled drive voltage in dependence on a PWM signal. The drive circuit constitutes a close circuit through which an electric current due to an inductance of the motor flows, when the drive voltage is off.

To achieve the above object, the present invention provides an electric power steering system for vehicles comprising a steering wheel, a steered wheel, a steering shaft for operatively transmitting a rotation of the steering wheel to the steered wheel, a direct-current motor for operatively providing auxiliary torque to the steering shaft, a power supply, a device for detecting steering torque acting on the steering shaft, and a control device for controlling the motor in dependence on a steering torque detection signal from the steering torque detecting device. The control device includes a control signal generating device for generating a PWM signal in dependence on the steering torque detection signal, and a motor drive circuit device which receives the PWM signal and applies an on-off voltage to the motor. The motor drive circuit device has a close circuit through which an electric current, due to an inductance of the motor, flows while the on-off signal is off. The steering system further comprises a device which detects a steering speed of the steering wheel and provides a detection signal to the control signal generating device. The control signal generating device generates the PWM signal in dependence, in a positive steering state in which the direction of the rotation of the steering wheel is coincident with that in which the steering torque is acting, on a first function and, in a steering wheel returning state in which the direction of the rotation of the steering wheel is not coincident with that in which the steering torque is acting, on a second function, having the steering torque and the steering speed as parameters thereof.

The above and further features, objects and advantages of the present invention will more fully appear from the following detailed description of the preferred embodiment of the invention when the same is read in conjunction with the accompanying drawings.

BRIEF DESCRIPTION OF THE DRAWINGS

FIG. 4B is a complement of FIG. 4A.

FIG. 5 is a graph describing output characteristics of detection signals of steering torque.

FIG. 6 is a graph describing output characteristics of detection signals of a steering speed.

FIG. 7 is a graph showing a relationship between the steering torque and such a term of a duty as attributable to a friction loss.

FIG. 8 is a graph showing a relationship between the steering torque and such a term of the duty as attributable to output of an auxiliary torque producing motor.

FIG. 9 is a graph showing a relationship between the steering torque and a correction term of the duty in a returning state of a steering wheel.

FIG. 10 is a graph showing a relationship between the steering speed and such a term of a duty as attributable to an inductive emf across the motor.

FIG. 11 is a graph showing relationships between the steering torque and the duty as the sum of the terms of FIGS. 7 to 9 in a positive steering state and the returning state of the steering wheel, respectively.

FIGS. 12A to 12C are diagrams of equivalent circuits in different working states of a motor drive circuit in the control circuit.

FIG. 13 is a graph plotting, for various rotation speeds of the motor, those duties determined for PWM signals to be applied to power switching transistors in the equivalent circuits of Figs. 12A to 12C.

DETAILED DESCRIPTION OF THE PREFERRED EMBODIMENT

Figures 1, 2:
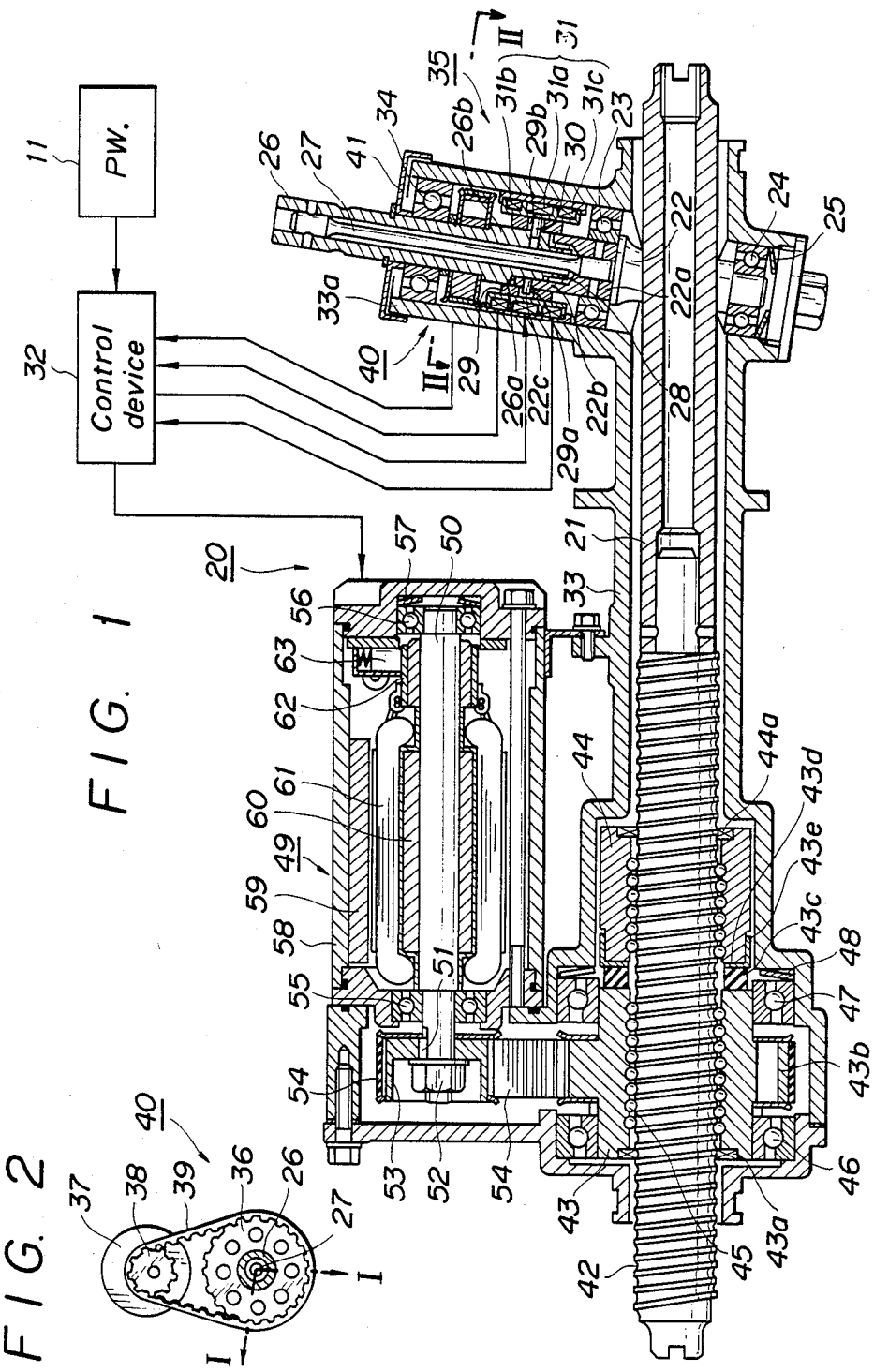
FIG. 1 is a longitudinal sectional view of an essential part of an electric power steering system for vehicles according to an embodiment of the invention.
FIG. 2 is a sectional view along line II—II of FIG. 1, which shows a direct-current generator for detecting a steering speed.

Referring to FIG. 1, designated at reference numeral 20 is an electric power steering system for vehicles according to an embodiment of the present invention. The system 20 includes as principal components thereof an input shaft 26, a rack shaft 21, a direct-current motor 49, and a control device 32. An unshown steering wheel is connected to the upper end of the input shaft 26, the lower end of which is interconnected through a pinion member 22 with the rack shaft 21 so that a rotation of shaft 26 is changed into a straight-linear motion in the axial direction of shaft 21. The rack shaft 21 is connected at both ends thereof through unshown tie-rods to the knuckles of unshown front wheels as steered wheels, respectively. The motor 49 provides auxiliary torque as assist power to the rack shaft 21. The control device 32 controls the motor 49 in dependence on detection signals from a steering torque sensor 35 and a steering speed sensor 40, which are disposed around the input shaft 26.

The lower end of input shaft 26 is inserted into a boss portion 33a of a rack casing 33, and has the pinion member 22 engaged therewith, which meshes with unshown rack teeth formed on the backside of rack shaft 21. It is noted that in FIG. 1 the section shown around input shaft 21 and pinion member 22 is developed at 90° about the axes thereof. The pinion member 22 is rotatably supported at the upper and lower ends thereof by angular contact bearings 23, 24, respectively. The lower bearing 24 is upwardly biased with a plate spring 25, so that the pinion 22 is restricted in axial movement. The pinion member 22 has a shaft 22a thereof interconnected with the input shaft 26 by a torsion bar 27 which extends along a hollow of the shaft 26. A recessed part at the upper end of the pinion shaft 22a is fitted on a reduced part at the lower end of input shaft 26, with a needle bearing 28 put therebetween. Between the input shaft 26 and the boss portion 33a of casing 33 there is put a ball bearing 34. The boss portion 33a is formed with an upward opening at the top, and covered with a dust boot 41.

The upper end of pinion shaft 22a is bifurcated such that bifurcations 22b thereof are both shaped fan-like in the radial sections and angularly spaced apart at 180° from each other. The bifurcations 22b are inserted into a pair of grooves 26a of a complementary form, which are provided outside of the reduced lower-end part of input shaft 26. The circumferential width of each groove 26a has a larger inscribed angle than that of a corresponding one of the bifurcations 22b, so that the torsion bar 27 may be twisted, developing a phase difference between pinion member 22 and input shaft 26, within a predetermined angle. The input shaft 26 and the pinion member 22 are thus relatively rotatably engaged with each other.

Around the mutually engaging parts of input shaft 26 and pinion member 22 there is disposed a differential transformer 31 which functions as the steering torque sensor 35. The transformer 31 comprises a cylindrical core 29, a single primary winding 31a, and a pair of secondary windings 31b, 31c. The windings 31a, 31b, 31c are fixed inside of the boss portion 33a so as to surround the core 29. Each bifurcation 22b of the pinion shaft 22a has a pin 22c radially outwardly projecting therefrom. Likewise, each arcuate wall part 26b between the grooves 26a of input shaft 26 has a pin 30 radially outwardly projecting therefrom. The pins 22c, 30 engage with elongate holes 29a, 29b formed in the core 29, respectively. Each hole 29a engaged with pin 22c at the side of pinion shaft 22a is formed in parallel with the axis of input shaft 26; and each hole 29b engaged with pin 30 at the side of input shaft 26, inclined at a predetermined angle relative to the same. Steering torque Ts acting on the input shaft 26 is transmitted through torsion bar 27 and pinion member 22 to the rack shaft 21, which is thereby straight-linearly displaced. If a larger load Fr than the steering torque Ts is imposed on the rack shaft 21 from the road surface (i.e., when a superior restoring force Fr acts on the front wheels), the torsion bar 27 is twisted with a phase difference (as a circumferential relative angular defference) developed between input shaft 26 and pinion member 22. Due to the engagement with pins 22c, 30, the core 29 is axially displaced in either sense corresponding to the direction in which the steering torque Ts is acting, at a distance depending on the magnitude of the steering torque Ts. With an ac (alternating current) voltage applied from the control device 32 to the primary winding 31a, the secondary windings 31b, 31c output a pair of ac voltages which are sent to the control device 32. The amplitudes of the output voltages are differentially variable in dependence on the axial displacement of the core 29. The core 29 is positioned so as to take a neutral position thereof when the steering torque Ts acting on the input shaft 26 is zero in magnitude or, in other words, when no phase difference is developed between input shaft 26 and pinion member 22. The transformer 31 as the steering torque sensor 35 thus provides a pair of output signals that inform in combination of the acting direction and magnitude of the steering torque Ts, i.e., it gives steering torque representative signals.

Between the transformer 31 and the bearing 34 there is arranged the steering speed sensor 40 which surrounds the input shaft 26 in configuration. The sensor 40 comprises a toothed large-diameter pulley 36, an electric generator 37, a toothed small-diameter pulley 38, and a timing belt 39. The large-diameter pulley 36 is fixed on the input shaft 26; and the small-diameter pulley 38, on an input shaft of the generator 37 which is arranged in parallel to the input shaft 26. The pulleys 36, 38 are interconnected by the belt 39 stretched thereover. The generator 37 outputs a dc (direct current) voltage of which the polarity corresponds to the direction of a rotation of the input shaft 26 and the magnitude is proportional to the speed thereof. The output voltage is sent as a steering speed representative signal to the control device 32.

The auxliary torque producing motor 49 comprises a stator 58 as a yoke, a number of eternal magnets 59, an armature core 60, an armature winding 61, a commutator 62, and a number of brush assemblies 63. The section shown is developed at 90° about the axis. The motor 49 is controlled to be driven by the control device 32 in dependence on the signals sent from the steering torque sensor 35 and steering speed sensor 40. It has a pair of bearings 55, 56 fixed to the stator 58, for rotatably supporting a rotor shaft 50, at both ends thereof. One 56 of the bearings is resiliently biased toward the other 55, with a plate spring 57. A toothed small-diameter pulley 53 is fixed on an external end part of the shaft 50 by means of a key 51, and fastened thereto with a nut 52. The pulley 53 is interconnected through a timing belt 54 with a ball and thread mechanism provided at the side of rack shaft 21.

The rack shaft 21 has at the left part thereof a spiral groove portion 42 formed along the outer circumference. The spiral groove portion 42 is engaged with respective spiral groove portions of a pair of ball bearing nuts 43, 44 which are fitted thereon side by side, with a plurality of rolling balls 45 put therebetween. An oil seal 43a is provided between the rack shaft 21 and a lefthand or outer one 43 of the nuts, at the left end thereof. Between the right end of the nut 43 and the other nut 44 there is inserted an elastic annular member 43c which carries a cylindrical flange member 43d fitted to the left end of the nut 44. The nut 43 has at the axially central part thereof a toothed large-diameter pulley 43b formed thereon. The large-diameter pulley 43b is interconnected through the timing belt 54 with the small-diameter pulley 53, so that a rotation of the motor 49 is transmitted to the nut 43, while being reduced in speed. The nut 43 is rotatably supported at both ends thereof in the casing 33 by means of angular contact bearings 46, 47 which are axially biased with a plate spring 48 to eliminate axial play. Another oil seal 44a is provided between the rack shaft 21 and the right nut 44, at the right end thereof. The left end of the nut 44 is fixed in an axially bent part 43e of the flange member 43d, with a preload given by rotating to drive the nut 44 in such a direction that the flange member 43d is pressed. The nut 44 is for keeping axial clearances among rack shaft 21, nut 43, and balls 45, as they are initially set.

The control device 32 is described below with reference to FIG. 3.

Represented by reference numeral 70 is a micro-computer unit (hereinafter called MCU). The MCU 32 has input thereto detection signals S1 to S5 from a steering torque detection circuit 72, a steering (rotation) speed detection circuit 76, and an abnormality detection circuit 87, through an A/D (analogue to digital) converter 71, following a command from the MCU 70 itself.

The steering torque detection circuit 72 comprises a drive unit 73, a pair of rectifiers 74a, 74b, and a pair of low-pass filters 75a, 75b. A clock pulse T1 in the MCU 70 is sent to the drive unit 72, where it is divided at a number of stages and amplified to obtain a rectangular or sinusoidal ac signal, which is output to the primary winding 31a of the steering torque sensor 35. The secondary windings 31b, 31c of the sensor 35 output ac signals in accordance with an axial displacement of the core 29, which are sent through the rectifiers 74a, 74b, where they are rectified, to the low-pass filters 75a, 75b, where they have high-frequency components thereof eliminated. As a result, they are converted into smooth dc voltage signals S1, S2, respectively.

The steering speed detection circuit 76 comprises a pair of subtractors 77a, 77b. Electric potentials at positive and negative pole terminals of the generator 37 are input to the subtractors 77a, 77b, with an identical polarity for one 77a and a reverse polarity for the other 77b, where the potential difference is obtained to be output as steering speed detection signals S3, S4. The signals S3, S4 are identical in magnitude and different in polarity.

The MCU 32 includes necessary unshown devices such as an I/O (input/output) port, memories, an arithmetic logical unit, a controller, and a clock generator which receives the clock pulse from a quartz oscillator.

A power circuit 11 for applying electric power to MCU 70 and other circuitries comprises a normally closed relay circuit 93 and a voltage stabilizer 94. A vehicle-mounted battery 90 is connected at the positive pole side through an ignition switch 91 and a fuse 92 to the relay circuit 93. The circuit 93 has an output terminal 93a for supplying a motor drive circuit 80 with a dc voltage of a battery-level Vcc. The same voltage is input to the stabilizer 94, which supplies a stabilized dc voltage of the Vcc level from an output terminal 93a to the respective detection circuits 72, 76, 80 as well as to MCU 70. While the ignition switch 91 is turned on, the MCU 70 is put in an energized state, where the input signals S1 to S5 from detection circuits 72, 76, 80 are processed, following a stored program in the memories. Control signals T3, T4, T5 are then output to the motor drive circuit 80 for driving the motor 49. The signal T3 is a rotation direction signal for controlling the polarity with which an armature voltage Va is applied to the motor 49, in dependence on a steering direction. The remaining two control signals T4, T5 are for controlling the magnitude of the armature voltage Va.

The motor drive circuit 80 comprises a drive unit 81 and a switching bridge circuit 82 which consists of four npn type bipolar transistors (hereinafter called Tr's) 80a, 80b, 80c, 80d constituting four arms of the bridge, respectively. An input lead of the circuit 82, which extends from the output terminal 93a of power circuit 93, terminate at the node between the collectors of neighboring two Tr's 80a, 80d; and another, which is connected through a resistor 82a to the negative pole of battery 90, at that between the emitters of the remaining two 80b, 80c. The emitters of Tr's 80a, 80d are connected to the collectors of Tr's 80b, 80c, respectively. The bases of the four Tr's 80a, 80b, 80c, 80d are connected to output terminals 81a, 81b, 81c, 81d of the drive unit 81, respectively. An output lead of circuit 82 extends from the node between emitter of Tr 80a and collector of Tr 80b, and another from that between collector of Tr 80c and emitter of Tr 80d. The output leads terminate on the brush assemblies of motor 49. Tr's 80a, 80b, and 80c, 80d have diodes 83, 84 and 85, 86 connected in parallel thereto, i.e., between collectors and emitters thereof, respectively, and inverse-parallel to the motor 49.

The drive unit 81 works in dependence on control signals T3, T4, T5, as follows.

(1) For clockwise acting steering torque Ts:

Tr's 80a, 80c are driven in combination with PWM signals from terminals 81a, 81c, respectively. Letting the duty of the PWM signal from terminal 81a be Du and that of the PWM signal from terminal 81c be Dd, in the positive steering state of the steering wheel the duty Du has a constant value of 1 (unity), whereas the duty Dd depends on the steering torque Ts. In the steering wheel returning state the duty Du is in inverse proportion to Ns, where Ns is the steering speed, while the duty Dd still depends on the steering torque Ts.

(2) For counterclockwise acting steering torque Ts:

Tr'a 80d, 80b are driven in combination with PWM signals from terminals 81d, 81b, respectively. The PWM signal from terminal 81d is of the duty Du, and that from terminal 81b, of the duty Dd. In the positive steering state of the steering wheel the duty Du is the constant of 1 (unity) and the duty Dd depends on the steering torque Ts. In the steering wheel returning state the duty Du is inversely proportional to the steering speed Ns, and the duty Dd in dependence on the steering torque Ts.

In both cases (1), (2) the armature voltage Va applied to the motor 49 has an average value proportional to the product of the duties Du, Dd of PWM signals with which two Tr's are driven in combination. The control signal T4 represents the duty Du of PWM signal to Tr 80a or 80d; and T5, the duty Dd of that to Tr 80b or 80c. The PWM signal from any of terminals 81a to 81d of drive unit 81 is a frequency-constant rectangular pulse voltage signal of the battery level Vcc, as modulated of the pulse duration or width.

The present embodiment includes the abnormality detection circuit 87 for detecting abnormalities in the motor drive circuit 80 and motor 49. The detection circuit 87 comprises an amplifier 88 and a low-pass filter 89. A voltage drop across the resistor 82a, which corresponds to the armature current Ia, is applied to the amplifier 88, where it is amplified to be input to the filter 89, where high-frequency components thereof are eliminated to obtain a dc voltage signal to be output as detection signal S5. The signal S5 is fed back through A/D converter 71 to MCU 70. The circuit 87 detects abnormalities of motor drive circuit 80 and motor 49, by monitoring the voltage drop across the resistor 82a. If an abnormality is detected, a relay control signal T2 is output from MCU 70 to the relay circuit 93 of power circuit 11, stopping power supply from the power circuit 11 to respective circuitries.

Figure 4A:
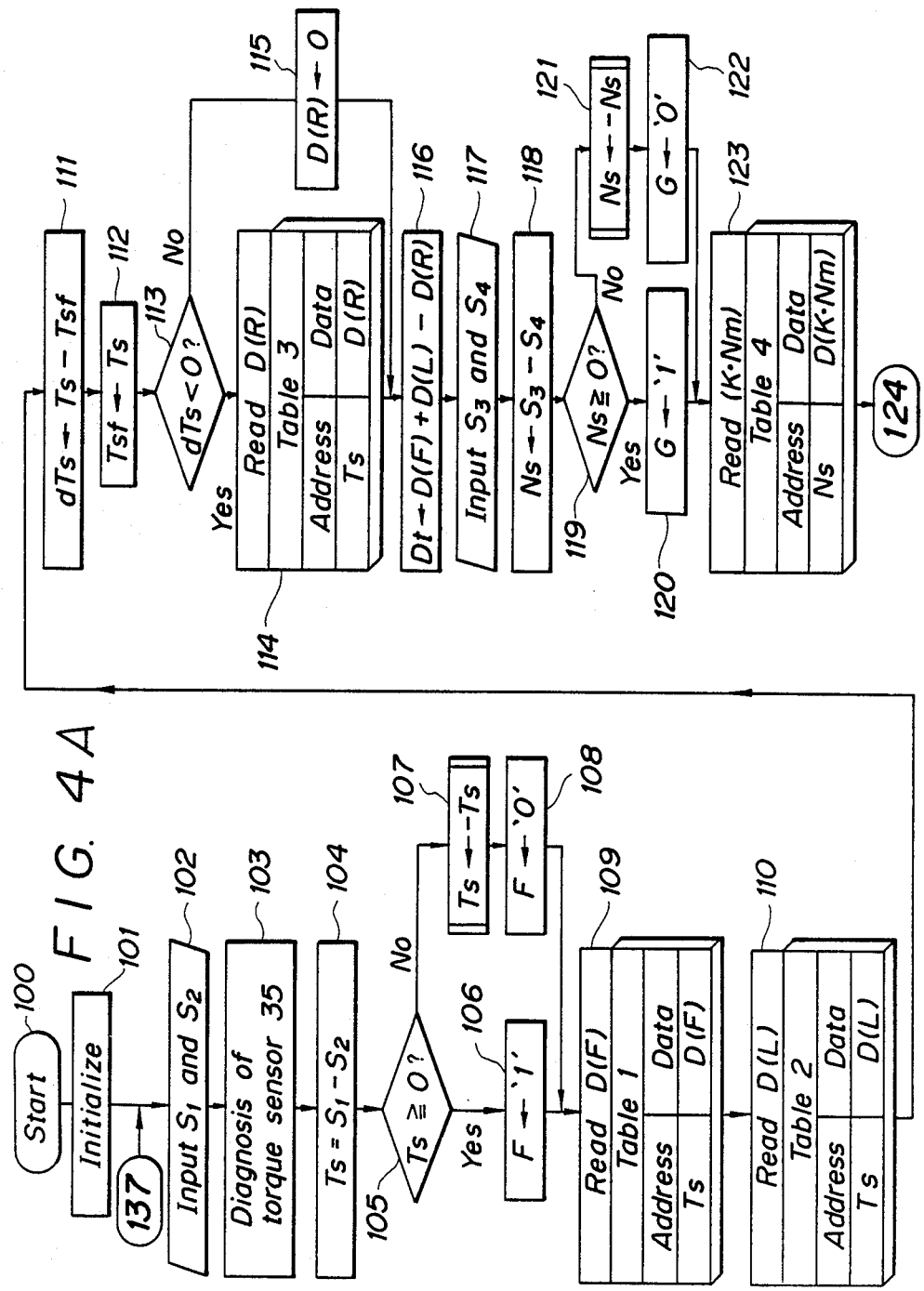
FIG. 4A is a flow-chart describing control processes to be executed by a micro-computer unit in the control circuit.
Figure 15:
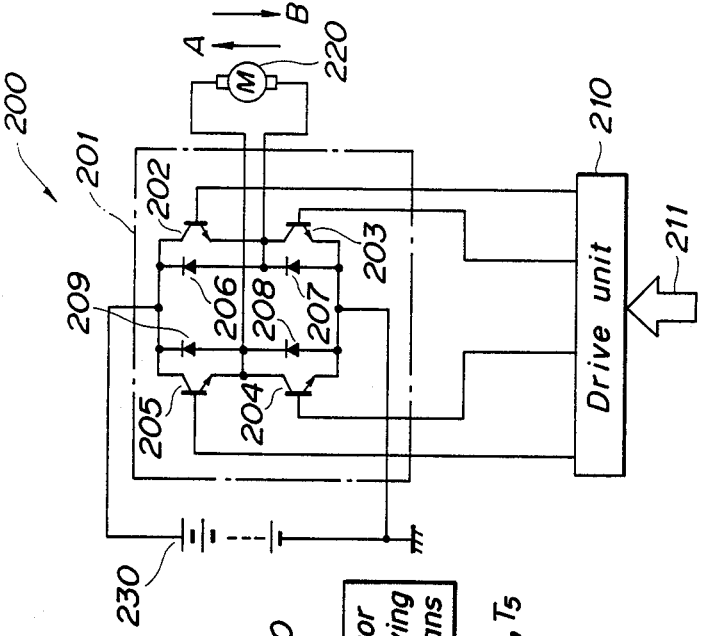
FIG. 15 is a diagram of a motor drive circuit according to the prior art, as described.

There will be described below various programmed functions of MCU 70, with reference to FIGS. 4A and 4B. FIGS. 4A, 4B are flow-charts schematically showing various control processes in MCU 70. Reference numerals 100 to 137 represent process setps.

With the ignition switch 91 turned on, electric power is applied to MCU 70 and other circuitries, permitting control functions thereof to be exhibited.

At step 101, registers of MCU 70 and data in a RAM (random access memory) are initialized, as well as associated circuits.

At step 102, the steering torque detection signals S1, S2 are read one by one. At step 103, a determination is made as to whether or not the signal value is normal. If the value is abnormal, the relay control signal T2 is output from MCU to the relay circuit 93, which interrupts power supply from power circuit 11. Control device 32 stops functioning, so that the steering system is put in a non-assisted state.

The sensor 35 of the steering torque detection circuit 72 comprises the differential transformer 31, as described, and the detection signals S1, S2 have such relationships to steering torque Ts as shown in FIG. 5. Half the sum of the signals S1, S2 is substantially equal to a constant k. At the step 103, it is determined whether or not the difference between (S1+S2)/2 and k lies within a predetermined range. If the difference does not fall within the range, the detection circuit 72 is diagnosed to be defective. In the case the read signals S1, S2 are normal, the program flow goes to step 104. The phase difference between input shaft 26 and pinion member 22 exceeds a predetermined value, when the bifurcations 22b abut on the arcuate wall parts 26b. This is why in FIG. 5 the signals S1, S2 have a constant value in left and right regions where the magnitude of steering torque Ts is larger than a given value.

At the step 104, a computation is made such that S1−S2, letting the result be a value of steering torque Ts.

At step 105, whether the value of Ts is positive or negative is determined, to thereby identify the acting direction of steering torque Ts. If the steering torque is clockwise or if the value is positive or zero, the program flow goes to step 106 to set a first flag F such that F="1", before it goes to step 109. If the steering torque is counterclockwise or if the value is negative, the flow goes from the step 105 to step 107, where the value of Ts is replaced by the aboslute value thereof such that Ts=−Ts. Then, at step 108, the first flag F is set such that F="0". The first flag F represents the sign of the value of Ts, i.e., the acting direction of the steering torque Ts.

At the step 109, a record written in a table 1 stored in an unshown ROM (read only memory) is directly read by designating an address in dependence on the absolute value of steering torque Ts; and at step 110, another record written in a table 2 stored in the ROM, in like manner. Each record of table 1 includes a value of a duty term D(F) which is attributable to the friction loss of the steering system; and that of table 2, a value of a duty term D(L) which is attributable to the road surface load. Those values of the duty terms D(F), D(L) have such relationships to the absolute value of steering torque Ts as shown in FIGS. 7 and 8, respectively. The absolute value of steering torque Ts may be multiplied by a certain factor so that the result has an adequate integer part to be employed in the address designation for gaining a reliable access to the data in the tables 1, 2. Such a multiplication process may preferably be applied to later-described steps 117, 123, as well.

At step 111, a computation is made such that Ts−Tsf, letting the result be a variation dTs of steering torque Ts, where Tsf is the steering torque Ts in the last time of program cycle. The last-time steering torque Tsf has an initial value thereof set to zero at the initialization step 101.

At step 112, the steering torque Ts of this time is substituted for the last-time steering torque Tsf. Then, the program flow goes to step 113.

At the step 113, the sign of steering torque variation dTs is identified to thereby determine whether or not the steering torque Ts is decreased. In the case the variation dTs is negative, there is made such a decision that the steering torque Ts should be a decreased one to be observed in a steering wheel returning state. The program flow then goes to step 114. At the step 114, a record written in a table 3 stored in the ROM is directly read by designating an address in dependence on the absolute value of steering torque Ts. Each record of table 3 includes a value of a duty term D(R) for correction. The value of correction term D(R) is in such a relationship to the absolute value of steering torque Ts as shown in FIG. 9. If the steering torque variation dTs is not negative, it is decided at the step 113 that the steering wheel should be in a positive steering state; the flow then goes to step 115 to set the duty term D(R) for correction to a zero value.

At step 116 there is made a computation with respect to thus obtained values of duty terms D(F), D(L), D(R), such that:

D(F)+D(L)−D(R), letting the result be a provisional duty Dt. The duty Dt has such a value as shown in FIG. 11, by an upper characteristic curve L1 which is for the positive steering state of steering wheel, or by a lower characteristic curve L2 for the steering wheel returning state.

At step 117, the detection signals S3, S4 from steering speed detection circuit 76 are read one by one. At step 118, a computation is made such that S3−S4, letting the result be a value of steering speed Ns. The signals S3, S4 have such relationships to the steering speed Ns as shown in FIG. 6. The generator 37 has a maximum output voltage lower than the battery level Vcc by a predetermined allowance.

At step 119, whether the value of Ns is positive or not is determined, to thereby identify the direction in which a steering operation is performed with the speed Ns. If the value of Ns is positive, i.e., if the steering speed is of a clockwise rotation, the program flow goes to step 120 to set a second flag G such that G="1". If the value of Ns is negative, the flow goes to step 121, where the value of Ns is replaced by the absolute value thereof such that Ns=−Ns. Then, at step 122, the second flag G is set such that G="0". The second flag G represents the direction of the steering operation, i.e., the direction of rotation of the steering wheel.

At step 123, a record written in a table 4 stored in the ROM is directly read by designating an address in dependence on the absolute value of steering speed Ns. Each record of table 4 includes a value of a duty term D(K.Nm) which is attributable to the inductive emf of the motor 49. The value of the duty term D(K.Nm) is in such a relationship to the absolute value of steering speed Ns as shown in FIG. 10.

At step 124, it is determined whether or not the first and second flags F, G are identical in value. In the case F=G ="1", the steering torque Ts and the rotation of steering wheel should be both clockwise. The steering wheel should thus be in a positive steering state. In the case F=G="0", both steering torque Ts and rotation of steering wheel should be counterclockwise. The steering wheel should be in a positive steering state. In those cases, the program flow goes to step 125. If F="1" and G="0", the steering torque Ts should be clockwise, and the rotation of steering wheel, counterclockwise. The steering wheel should thus be in a returning state. If F="0" and G="1", the steering torque Ts should be counterclockwise, and the rotation of steering wheel, clockwise. The steering wheel should be in a returning state. In the latter two cases, the flow goes to step 127.

At the step 125, the duty Du of the PWM signal to Tr 80a or 80d is given a value of 1 (unity). The program flow goes to step 126, where a summation is made such that Dt+D(K·Nm), letting the result be a value of the duty Dd of the PWM signal to Tr 80c or 80b. Thereafter it goes to step 129.

At the step 127, a subtraction is made such that 1−D(K·Nm), letting the result be a value of the duty Du of the PWM signal to Tr 80a or 80d. The program flow goes to step 128, where the provisional duty Dt is substituted for the duty Dd of the PWM signal to Tr 80c or 80b. Thereafter it goes to the step 129.

At the step 129, a determination is made as to whether or not the value of duty Dd for Tr 80c or 80b is unequal to zero. If Dd is unequal to zero, the program flow goes to step 130. If it is not so, the flow goes to step 133.

At the step 130, the value of the first flag F is identified to thereby judge the acting direction of steering torque Ts. If F="1", the program flow goes to step 131, where a pair of direction flags R, L are given such values that R="1" and L="0". If F="0", the flow goes to step 132 give the direction flags R, L such values that R="0" and L="1". The flags R, L correspond to the direction control signal T3. In the case R="1" and L="0", Tr's 80a, 80c are driven in combination. In the case R="0" and L="1", Tr's 80d, 80b are driven in combination.

At the step 133, the direction flags F, R are both set to zero.

At step 134, the values of the direction flags R, L are output, as they are set at any of the steps 131 to 133. At step 135, the values of the duties Du, Dd are output, as they are set at the steps 125, 126 or 127, 128. The values of the duties Du, Dd correspond to those of signals T4, T5. If the value of Du is unity, the PWM signal as sent to a selected one of Tr's 80a, 80d is continuously on. In the case the values of direction flags R, L are both "0", however, none of Tr's 80a to 80d receives PWM signal, i.e., no PWM signals are output.

At step 136, there is read the detection signal S5 from abnormality detection circuit 87 which corresponds to the armature current Ia of motor 49. At step 137, a diagnosis is made with a certain allowance as to whether or not the signal S5 has an abnormal component. If the signal S5 is abnormal, the relay control signal T2 is sent from MCU 70 to the relay circuit 93, which interrupts power suuply from power circuit 11. If no abnormalities are found, the program flow goes to the step 102.

In the present embodiment, the value of duty Du of the PWM signal to Tr 80a or 80d and that of duty Dd of the PWM signal to Tr 80c or 80b are set by processes at the steps 125, 126 or 127, 128. The setting is individual between the positive steering state and returning state of steering wheel, so that the bridge circuit 82 works in different modes therebetween as shown by equivalent circuits of FIGS. 12A to 12C.

Steering torque Ts is now supposed to be clockwise acting.

In the positive steering state of steering wheel, the duty Du of PWM signal to Tr 80a has a unity value and thus Tr's 80a; 80c are to be driven in no way but as shown in FIGS. 12A and 12B. The proportion with which the state of FIG. 12A occurs is correspondent to the value of duty Dd of the PWM signal to Tr 80c.

In the steering wheel returning state, the value of duty Du of the PWM signal to Tr 80a decreases in reverse proportion to the magnitude of steering speed Ns. The steering wheel is mechanically interconnected with the motor 49, as will be seen from FIG. 1, so that the steering speed Ns corresponds to the rotation speed of motor 49. The value of duty Dd of the PWM signal to Tr 80c is very small. Such an expression may thus be suitable and comprehensible that the state of FIG. 12A seldom occurs. In like sense, though unshown, there hardly occur such a state that the PWM signal to Tr 80a is off and that to Tr 80c is on. In the steering wheel returning state, therefore, the state of Figs. 12B and 12C are frequently observed. As the steering speed Ns increases, the duty Du becomes small, while Dd follows curve L2 of FIG. 11. The frequency of occurrence of the state of FIG. 12C thus rises, as the steering speed Ns increases or as the steering torque Ts becomes small (refer to steps 127, 128 and FIGS. 10, 11). In other words, the time fraction during which a close circuit 49-86-80a of FIG. 12B becomes small, as the steering speed Ns increases or as the steering torque Ts becomes small. In the state of FIG. 12C there is formed a single close circuit 49-86-11-84. An armature current Ia' due to a counter emf Vi of the motor 49 may theoretically flow the close circuit 49-86-11-84. Supply voltage of power source 90 in the close circuit however is opposite in polarity to counter emf Vi and in most cases larger in emf than Vi, so that practically armature current Ia' does not flow through the close circuit or it hardly flows in FIG. 12C. This implies that the front wheels have no appreciable work done to the motor 49. In the steering wheel returning state, therefore, the front wheels as well as the steering wheel can be restored to the neutral positions with smooth, as in a manual steering system without assist power. For the case of counterclockwise acting steering torque Ts, description is omitted.

Figure 17:
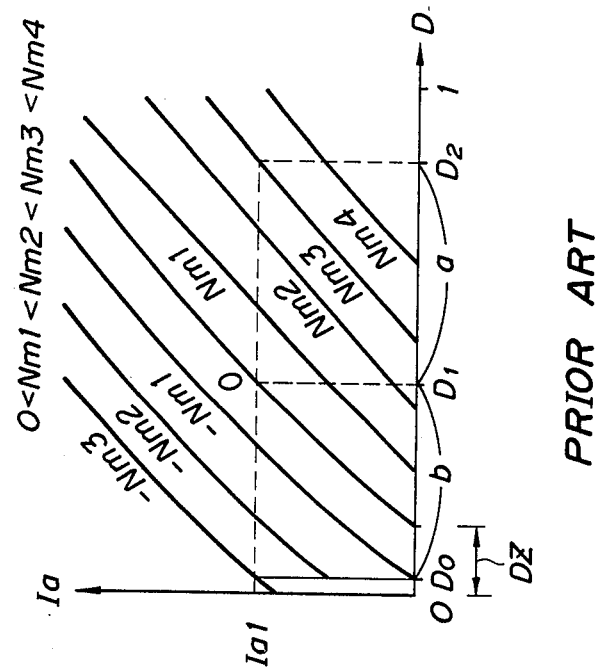
FIG. 17 is a graph showing relationships between an armature current and a duty of a PWM signal to be applied to a power switching transistors in the equivalent circuits of FIGS. 16A and 16B, as described.
Figure 16A:
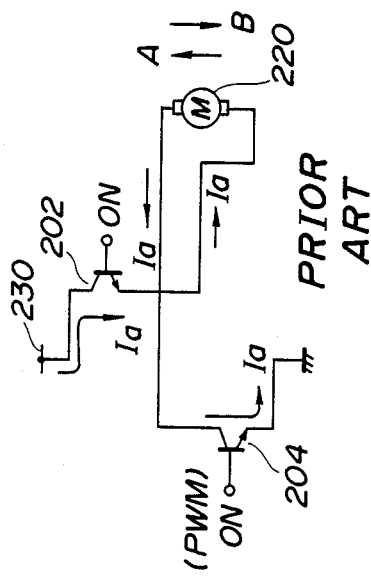
FIGS. 16A and 16B are diagrams of equivalent circuits in different working states of the motor drive circuit of FIG. 15, as described.
Figure 16B:
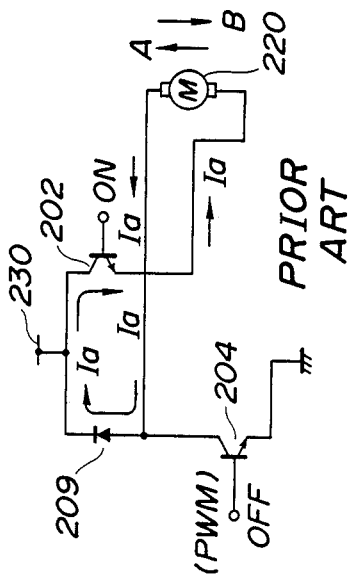

Theoretical discussion is given below with reference to FIG. 13, which is a graph describing driven status of Tr's 80a, 80c in Figs. 12B and 12C, in relation to various negative rotation speeds of the motor 49. Steering torque Ts is supposed to be clockwise acting. The axis of abscissa represents the rotation speed Nm of motor 49 in a negative region, and the ordinate the duty Du of the PWM signal to Tr 80a. Three characteristic curves L3, L4, L5 are plotted by using as their parameter the duty Dd of the PWM signal to Tr 80c. The duty Dd is fixed for example at a value D3. Under this condition, the duty Du is given a unity value. The motor 49 has a zero speed when a load Fr3 is imposed. An armature current Ia'3 flows in correspondence to the load Fr3. Then, the load imposed on the motor 49 is gradually increased from Fr3, thereby increasing the negative motor speed Nm in absolute value. As the negative motor speed Nm increases in absolute value, such values of the duty Du as necessary to maintain the armature current at Ia'3 are plotted to obtain the curve L3. Then, the duty Dd is fixed at decreased values D4 and D5 (D3 D4 D5). The duty Du is given a unity value; the motor 49 has a zero speed when increased loads Fr4, Fr5 (Fr3 Fr4 Fr5) are imposed. The curves L4, L5 are likewise obtained; they are substantially coincident with the curve L3. This implies that the armature current Ia' will not increase if the duty Du of PWM signal to Tr 80a is decreased in correspondence to the negative rotation speed Nm of the motor 49, irrespective of the value of duty Dd of the PWM signal to Tr 80c. In FIG. 17 the characteristic curves for negative motor speeds −Nmi may become coincident with the curve of zero speed (Nm=0), by controlling the duty Du in accordance with such curves as plotted in FIG. 13.

Figure 3:
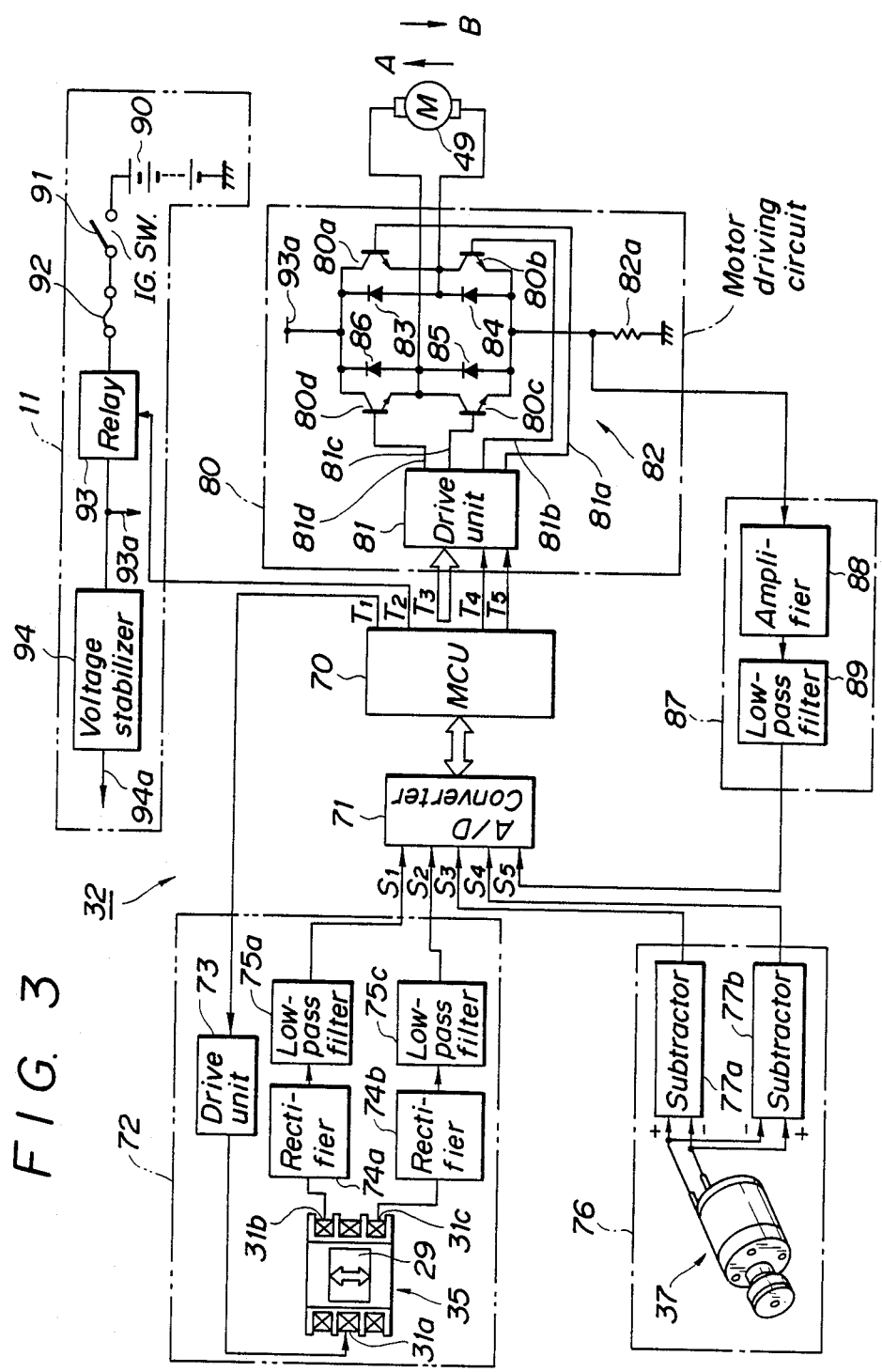
FIG. 3 is a diagram of a control circuit of the steering system.
Figure 14:
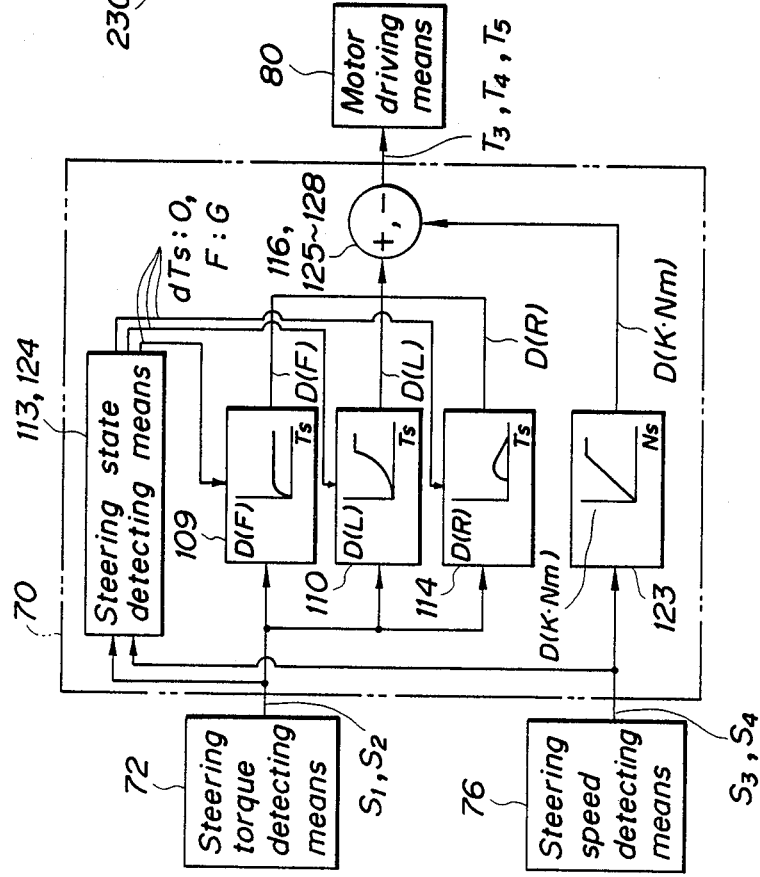
FIG. 14 is a functional block diagram of the control circuit of FIG. 3.

FIG. 14 is a schematic functional block diagram of the control device 32, which illustrates interrelations between principal components of the device 32 shown in FIG. 3 and various steps of the program flow of FIGS. 4A and 4B. The detection signal S5, control signals T1, T2 and so on are omitted.

The electric power steering system 20 employs the steering speed sensor 37 in addition to the steering torque sensor 35. The MCU 70 determines values of the duties Du, Dd depending, in a positive steering state of the steering wheel, on such a first function as conditioned to the steps 125, 126 and, in a steering wheel returning state, on such a second function as conditioned to the steps 127, 128. More particularly, in the positive steering state of the steering wheel, the duty Du of PWM signal to Tr's 80a, 80d has a value of unity, and the duty Dd of PWM signal to Tr's 80c, 80b a value in proportion to steering torque Ts and steering speed Ns. In the steering wheel returning state, the duty Du has a value in reverse proportion to steering speed Ns, and the duty Dd a value in proportion to steering torque Ts. In the returning state, therefore, the proportion with which the state of FIG. 12 takes place decreases as the negative rotation speed −Nm of the motor 49 increases in absolute value. The conduction of an armature current Ia' due to an inductive emf Vi of the motor 49 is thus decreased in degree. As a result, the steering wheel is permitted to smoothly return to the neutral position. There can be expected a steering wheel returning characteristic such as will be achieved in a steering system without assist power.

In a modification, in the positive steering state of the steering wheel the duty Du of the PWM signal to Tr 80a may have a value in proportion to steering wheel Ts and steering speed Ns, and the duty Dd of the PWM signal to Tr 80c, a value of unity. In the steering wheel returning state, the duty Du may have a value in proportion to steering torque Ts, and the duty Dd a value in reverse proportion to steering speed Ns.

In the embodiment, four npn type bipolar transistors 80a to 80d are employed as switching elements constituting arms of the bridge circuit 82. There may preferably employed pnp type bipolar transistors or n-channel enhancement type MOS (metal oxide semiconductor) FET's (field effect transistors). In the use of such FET's, their internal reverse diode characteristic may substitute for the diodes 83 to 86.

Although there has been described what is at present considered to be the preferred embodiment of the invention, it will be understood that the present invention may be modified in other specific forms without departing from essential characteristics thereof. The present invention is therefore to be considered in all respects as illustrative but not restrictive. The scope of the invention is indicated by the appended claims rather than by the foregoing description.

I claim:

1. An electric power steering system for a vehicle comprising:
    a steering wheel;
    a steered wheel;
    a steering shaft transmitting a rotation of said steering wheel to said steered wheel;
    a direct-current motor providing auxiliary torque to said steering shaft;
    steering torque detecting means for detecting steering torque acting on said steering shaft;
    steering speed detecting means for detecting a steering speed of said steering wheel; and
    control means for controlling said motor depending upon a steering torque detection signal from said steering torque detecting means and a steering speed detection signal from said steering speed detection means, said control means including control signal generating means, for generating a PWM signal which depends upon said steering torque detection signal and said steering speed detection signal, and motor drive circuit means for receiving said PWM signal and for applying an on-off voltage to said motor, said motor drive circuit means having a close circuit through which an electric current, due to an inductance of said motor, flows while said on-off signal is off;
    said control signal generating means, in a positive steering state in which a direction of rotation of said steering wheel is coincident with a direction that said steering torque is acting, for generating said PWM signal depending upon a first function and, said control signal generating means, in a steering wheel returning state in which the direction of rotation of said steering wheel is not coincident with the direction that said steering torque is acting, for generating said PWM signal depending upon a second function, said first function has a parameter which is different from a parameter of said second function.

2. An electric power steering system for vehicles according to claim 1, wherein:
    said motor drive circuit means comprises a bridge circuit for driving said motor, said bridge circuit includes a first, a second, a third, and a fourth switching elements, and four diodes connected in parallel to said switching elements, and said bridge circuit having a first input node thereof between said first switching element and said fourth switching element and having a second input node thereof between said second switching element and said third switching element, said first and second input nodes being connected to positive and negative terminals of a power supply, respectively, and said bridge circuit having a first output node thereof between said first switching element and said second switching element and a second output node thereof between said third switching element and said fourth switching element, said first and second output nodes being connected to both input terminals of said motor.

3. An electric power steering system for vehicles according to claim 2, wherein:
    in said positive steering state, coincident to the direction of said steering torque, either of said first switching element or said third switching element operating together or either of said fourth switching element or said second switching element operating together, is fed with said PWM signal of which a duty is proportional to said steering torque and said steering speed, and the other of said first switching element or said third switching element or the other of said fourth switching element or said second switching element is fed with said PWM signal of which a duty is unity, and in said steering wheel returning state, non-coincident to the direction of said steering torque, said either of said first switching element or said third switching element or said either of said fourth switching element or said second switching element is fed with said PWM signal of which a duty is proportional to said steering torque, and said other of said first switching element or said third switching element or said other of said fourth switching element or said second switching element, is fed with said PWM signal of which a duty is reversely proportion to said steering speed.

4. An electric power steering system for vehicles according to claim 2, wherein:
said switching elements comprises npn type transistors.

5. An electric power steering system for vehicles according to claim 1, wherein:
said steering shaft is mechanically interconnected with said steering wheel, and said motor is mechanically interconnected with said steering shaft.

6. An electric power steering system for a vehicle comprising:
a steering wheel;
a steered wheel;
a steering shaft transmitting a rotation of said steering wheel to said steered wheel;
a direct-current motor providing auxiliary torque to said steering shaft;
a power supply;
steering torque detecting means for detecting steering torque acting on said steering shaft;
steering speed detecting means for detecting a steering speed of said steering wheel;
control means for controlling said motor depending upon a steering torque detection signal from said steering torque detection means and a steering speed detection signal from said steering speed detecting means, said control means including a control signal generating means for generating a PWM signal depending upon said detection signals, and a motor drive circuit means for receiving said PWM signal and for applying an on-off voltage to said motor,
wherein said motor drive circuit means comprises a bridge circuit for driving said motor, said bridge circuit includes first, second, third, and fourth switching elements, said bridge circuit having a first input node thereof between said first switching elements and said fourth switching element and having a second input node thereof between said second switching element and said third switching element, said first and second input nodes being connected to said terminals of said power supply, respectively, and said bridge circuit having a first output node thereof between said first switching element and said second switching element and having a second output node thereof between said third switching element and said fourth switching element, said first and second output nodes being connected to both input terminals of said motor, respectively, said bridge circuit further comprising four diodes connected in parallel to said first, second, third, and fourth switching elements,
said PWM signal comprises a first component which selects either of said first and third switching elements or said fourth and second switching elements depending upon a direction in which the steering torque is acting, a second component for driving a selected one of said first and fourth switching elements, and a third component for driving a selected one of said third and second switching elements;
said control signal generating means generates said second and third components of said PWM signal depending: (i) in a positive steering state in which a direction of rotation of said steering wheel is coincident with that in which said steering torque is acting, upon a first function and a second function, respectively, and (ii) in a steering wheel returning state in which the direction of said rotation of said steering wheel is not coincident with that in which said steering torque is acting, upon a third function and a fourth function, respectively; and
said first function has a different parameter from that of said function, and said second function has a different parameter from that of said fourth function.

7. An electric power steering system for a vehicle according to claim 6, wherein in said positive steering state, said secondary component has a unity duty, and said third component has a duty which is proportional to said steering torque and said steering speed, based on said first and second functions, and
in said steering returning state, said second component has a duty which is reversely proportional to said steering speed, and said third component has a duty which is proportional to said steering torque, based on said third and fourth functions.

8. An electric power steering system for a vehicle comprising:
a steering wheel;
a steered wheel;
a steering shaft transmitting a rotation of said steering wheel to said steered wheel;
a direct-current motor providing auxiliary torque to said steering shaft;
steering torque detecting means for detecting steering torque acting on said steering shaft;
steering speed detecting means for detecting a steering speed of said steering wheel; and
control means for controlling said motor depending upon a steering torque detection signal from said steering torque detecting means a steering speed detection signal from said steering speed detection means, said control means including control signal generating means, for generating a PWM signal which depends upon said steering torque detection signal and said steering speed detection signal, and motor drive circuit means for receiving said PWM signal and for applying an on-off voltage to said motor, said motor drive circuit means having a close circuit through which an electric current, due to an inductance of said motor, flows while said on-off signal is off;
said control signal generating means, during a positive steering state in which a direction of rotation of the steering wheel is coincident with a direction that the steering torque is acting, generating said PWM signal having a duty proportional to the steering torque and steering speed, and said control signal generating means, during a steering wheel returning state in which the direction of rotation of the steering wheel is not coincident with the direction that the steering torque is acting, having a duty which is proportional to said steering torque and reversely proportional to said steering speed.

* * * * *